Figure 1:
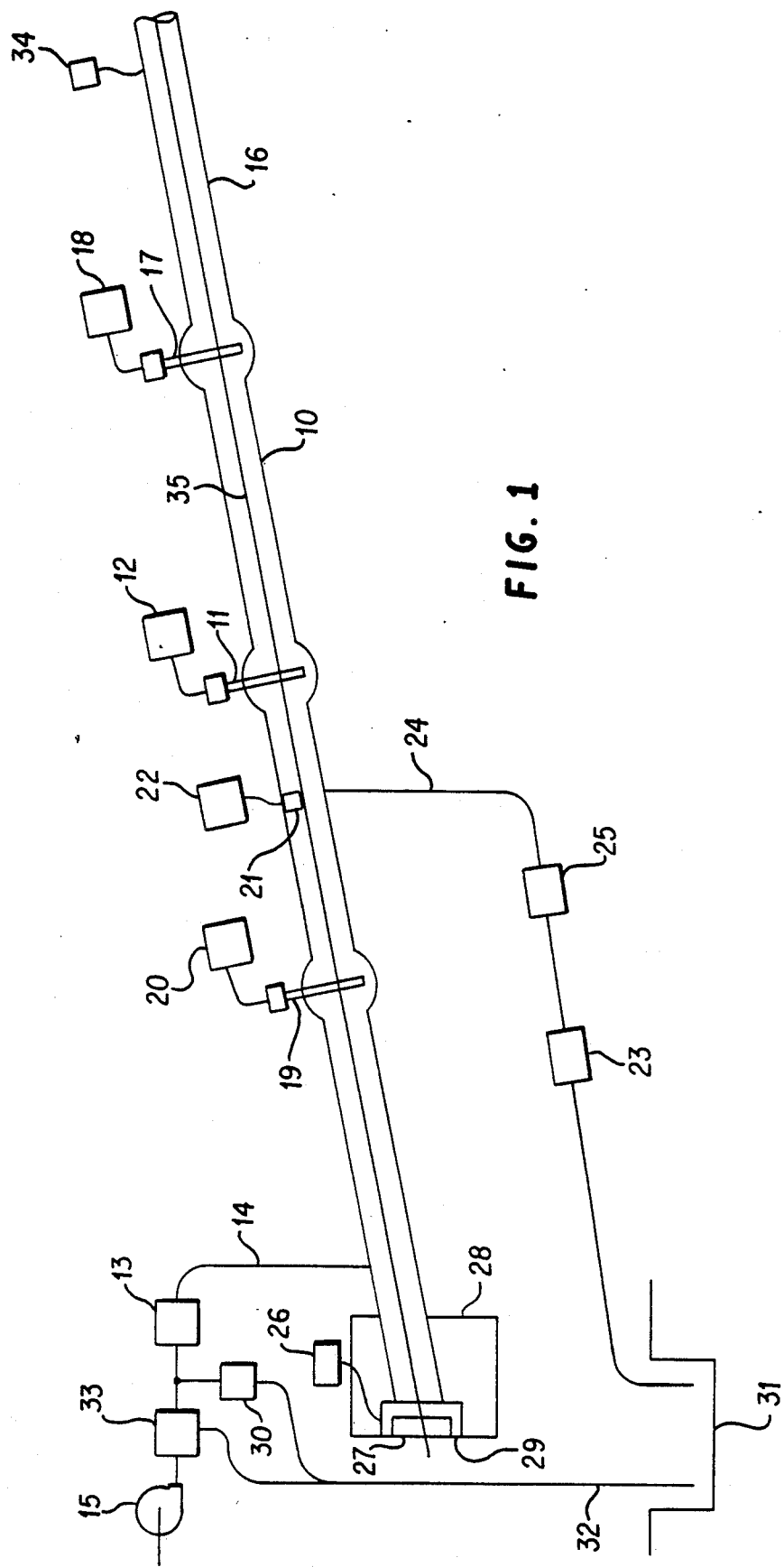

United States Patent [19]

Martin et al.

[11] Patent Number: 4,657,969

[45] Date of Patent: Apr. 14, 1987

[54] CONTINUOUS VULCANIZATION INTERFACE CONTROL

[75] Inventors: Ronald R. Martin; Clifford E. Witcher, Jr., both of Carrollton, Ga.

[73] Assignee: Southwire Company, Carrollton, Ga.

[21] Appl. No.: 707,188

[22] Filed: Mar. 4, 1985

Related U.S. Application Data

[63] Continuation of Ser. No. 509,391, Jun. 30, 1983, abandoned.

[51] Int. Cl.⁴ .............................................. C08J 3/24
[52] U.S. Cl. ..................................... 525/51; 264/347; 525/52; 525/354
[58] Field of Search .......................... 525/51, 52, 354; 264/347

[56] References Cited

U.S. PATENT DOCUMENTS 3,130,447  4/1964  Karl et al. ...................... 264/347 X
4,360,492  11/1982  Rowland et al. ............... 264/347 X

FOREIGN PATENT DOCUMENTS 997734  7/1965  United Kingdom .

*Primary Examiner*—Paul R. Michl
*Attorney, Agent, or Firm*—Herbert M. Hanegan; Stanley L. Tate

[57] ABSTRACT

Method of and apparatus for controlling the liquid-steam interface in a continuous vulcanization system which includes the steps of selecting a preferred water-steam interface position within a curing tube, detecting the elevation of water in the tube by a water sensitive sensing means, converting the detected elevation data into a signal, and controlling the position of the interface according to the signal.

11 Claims, 1 Drawing Figure

CONTINUOUS VULCANIZATION INTERFACE CONTROL

This application is a continuation of application Ser. No. 509,391, filed 6-30-83, now abandoned.

TECHNICAN FIELD

This invention relates generally to continuous vulcanization apparatus and methods and more particularly to a method of and an apparatus for controlling the liquid-steam interface in a continuous vulcanization apparatus and the product of this process.

BACKGROUND ART

In the cable making art there are generally two types of insulation and/or jacket material used in the fabrication of the electrical wire and cable, thermosetting materials and thermoplastic materials. Application of thermosetting materials as the insulation of jacket of an electrical wire or cable requires the use of vulcanization (curing) apparatus to cause the thermosetting reaction to occur. The most widely accepted technique for manufacturing extruded vulcanized type cables is to pass the conductor through a series of extruder heads and apply concentrically the semi-conducting and insulating compounds. After application of the semi-conducting and insulating compounds, the cables are vulcanized under pressure in a saturated steam environment followed by cooling under pressure. In such a steam curing process, the insulated conductor is moved through the vulcanizing apparatus and exposed to pressurized, saturated steam (typically 275 psi) followed by cooling under pressurized water (typically 275 psi). The thermosetting compound contains curing agents which are activated at the high temperatures found within the vulcanization apparatus and the speed of the vulcanization reaction depends on the temperature within the vulcanizing apparatus (for 275 psi steam, approximately 210° C.). Long length vulcanization pipes have been demonstrated to be preferred by those practicing the art of steam curing cables because polyethylene and ethylene-propylene rubber insulations normally have high thermal resistances. As a result, heavily insulated cables of the type used for high voltage operation require long curing time. For this reason a steam curing process is normally used in a horizontal, vertical, slant or catenary continuous vulcanization apparatus. Conventional long steam curing systems are well known in the art.

The conventional CV process is a curing process for insulation being applied to cable wherein the insulation is applied by an extruder and the newly insulated conductor passes into a closed, sealed curing cube. The length of time required for the curing operation is dependent upon time and temperature. As the temperature is elevated in the curing tube, the time required is decreased. Normally, saturated steam is used as a curing media. Saturated steam at 275 psi gives a curing temperature of approximately 410° F. Inside the curing tube, the cable is exposed directly to the saturated steam until it has cured a sufficient time. Before removing the cable from the closed, sealed curing tube, the insulation must be cooled. To accomplish this, cool water is injected in to the lower end of the tube. Thus, approximately ⅓ of the tube is being filled with water, and appromately ⅔ of the tube is being filled with the saturated steam. The purpose of the present steam-water interface control is to control the point where steam and water meet. The location of this point is very critical to the overall curing process because excess water in the tube shortens the time available to cure the cable. Not enough water in the tube results in insufficient cooling time, and does not allow the cable to properly cool before it is pulled through a series of mechanical seals at the end of the tube.

Historically, a heat sensitive thermocouple has been strapped directly to the tube at the estimated area of the liquid-steam interface. This thermocouple in theory senses the change in tube temperature created by the cold water as it is pumped into and up the tube. The thermocouple will generate an electrical signal to shut the pump off and allow the steam to overpressure the water. As the water starts back down the tube away from the thermocouple, the heat of the steam increases the tube temperature and generates a signal that will start the pump again and water is pumped back up the tube. The thermocouple then senses a lowered temperature and will again shut the pump off. Since it is only a heat sensitive device, the thermocouple cannot be relied upon to give a proper water level indication, and therefore the thermocouple is not a reliable indicator of conditions inside the tube. Instead, both water level and temperature should be controlled.

The conventional means of controlling water temperature is a bleed valve placed approximately five to ten feet behind the estimated interface point on the bottom of the tube. This valve is normally a manually controlled valve, and its purpose is to keep the hot steam from overheating the water in the tube. Hot water is bled through the bleed valve to prevent overheating of the cooling section.

Conditions inside this closed tube are similar to the conditions in the radiator of an automobile. Under pressure in a car radiator, water is at temperatures of above atmospheric boiling point (212° F.) but, immediately when the radiator cap is removed steam flashes. A similar condition existed on a much more severe basis inside the curing tube of a CV apparatus since saturated steam inside this tube is at 410° F. and 275 psi. Although the prior art assumed that the water-steam interface occurred at a point in the tube corresponding to an externally detected increase in temperature to above 212° F., the inventors of the present invention realized that water could exist inside this tube at highly elevated temperatures. If this very hot water were present inside the curing tube it would present a problem to the curing process. Even at very high temperatures water does not have the same total BTU content or heat content as would be present with saturated steam. Approximately ⅔ of the energy per pound of steam is the latent energy, the energy required to make the initial water change from a liquid state to a vapor state. Only approximately ⅓ of the total energy in that steam is the heat required to raise this liquid to a specified temperature. Thus, if hot water at temperatures above 212° F. is allowed to exist in the curing tube in quantities that can not be detected by a thermocouple which blindly controls the water level in the tube, the very hot water will impair the curing process because it will displace saturated steam and will prevent the saturated steam from having direct contact with a length of the cable. Although there is some curing effect from the hot water, it is totally insufficient when compared with a steam atmosphere in the corresponding length of the tube.

By checking temperatures at 20 foot intervals down the curing tube, it was determined that the temperature would run 400 degrees, 400 degrees, 400 degrees, and then at a certain point the temperature would rise to about 410° F. and then decrease again to about 400° F. At a point on the tube on supposedly the steam section of the tube a spot always appeared in these readings where the tube temperature was elevated between 10° F. and 20° F. This was only a small section of the tube approximately 10-15 feet of the length of the tube. It was concluded that this temperature spike or increase at a point on the curing tube was a significant indicator of conditions inside the tube. Several CV machines were checked to be sure that this was not a peculiar phenomenom to the one CV line and in every case that was checked, this temperature increase was evident. It was determined that in fact there were two separate interface points.

In the prior art, thermocouples used on the tube were controlling an interface, but it was an interface between hot water and cold water. The second interface point represented by the temperature spike was the liquid-steam interface, was not recognized in the prior art, and was not controlled, but instead was allowed to roam or drift up and down the tube depending upon the open or closed position of the manually operated bleed valve. The temperature spike is the point where the steam-water interface occurs as the latent energy of the steam is being taken off. This represents approximately ⅔ of the total heat content of the steam which results in a temperature increase (net) in the tube temperature at this point where the state change occurs. It was realized that approximately 165 feet of the curing tube was being consumed by hot water which was not detected and could not be controlled by the conventional thermocouple equipment. This 165 feet of hot water represents approximately 100 feet of equivalent curing tube that was being lost which represents approximately about 20% to about 25% of the total cure capacity.

DISCLOSURE OF INVENTION

It is therefore a primary object of this invention to provide a method of and an apparatus for detecting and controlling the actual steam-water interface in a continuous vulcanization system.

Another object is to increase productivity in a CV system by increasing production speed or decreasing tube length.

Still another object is to provide a substantially completely cured cable product.

BRIEF DISCRIPTION OF THE DRAWING

While the specification concludes with claims particularly pointing out in distinctly claiming the subject matter which is regarded as the invention, it is believed that the invention, objects, features and advantages thereof will be better understood from the following description taken in connection with the accompanied drawing wherein;

FIG. 1 is a schematic elevation of the continuous vulcanization interface control apparatus of the present invention.

BEST MODE FOR CARRYING OUT THE INVENTION

Referring now to FIG. 1, the continuous vulcanization line is indicated generally at 10. A primary level probe 11 (preferably a capacitance type continuous readout probe) is connected to a transmitter 12 which transmits a continuous 4 milliamp to 20 milliamp signal. Water touching the bottom of probe 11 generates a 4 milliamp signal, and as the water level rises on the probe 11, a corresponding signal increase is generated until a high level of 20 milliamps is achieved at the upper indication on probe 11. This signal is transmitted by transmitter 12 to control valve 13 which is located in the water inlet line 14 which feeds water from the pump 15 into the CV tube 16. The control valve 13 is an electronic proportional control valve such that a 4 milliamp signal input into this valve 13 causes the valve 13 to be fully open. As the signal from transmitter 12 increases toward 20 milliamps, because of a rising water level on probe 11, this valve, closes proportionally to the control signal. At 20 milliamps, control valve 13 is fully closed. As water rises or falls in the tube 16 and on probe 11, control valve 13 begins to close or open proportionally to the changes detected in the water level and the valve 13 will continue to close or open until equilibrium is reached. Since control valve 13 is a proportional mechanism, pump 15 operates continuously and the unneeded water is directed along line 32 by pressure relief valve 30 to sump 31 for recycling through the system. As an added advantage, pump 15 avoids the repeated strain of intermittent starting and stopping.

As a fail-safe backup system, a high water probe 17 is located in the tube 16 upstream of the primary level probe 11. High level probe 17 is connected to a transmitter 18 which communicates with high water control valve 33. If for some reason there is a failure of the primary level probe 11, the high water probe 17 will detect the failure and cause transmitter 18 to close valve 33 for a predetermined amount of time. As the water supply from the pump 15 is shut off, water pressure gradually bleeds down in tube 16 as steam pressure overcomes water pressure and lowers the water level in the tube 16. The high water level transmitter 18 is set on a time delay such that when it shuts off water flow, water is allowed to receed from the high water level probe 17 before the water supply is automatically turned back on by valve 33 at the end of the predetermined time period. Since water pressure is greater than steam pressure, this water pressure forces water to rise up the tube and if it again touches the high water level probe 17, transmitter 18 and valve 33 will shut the water supply off and the cycle is repeated.

A third probe 19 located in the tube 16 is a fail-safe low water level probe 19 which is connected to transmitter 20 to cause steam relief valve 34 to release steam from the upper portion of the tube 16. In this manner steam damage to the line 10 is prevented by exhausting steam while allowing valve 13 to continue to force water into the tube 16 when absence of water is detected. Steam release is continued for a sufficient amount of time to increase the water level to approximately the level of the main control probe 11.

Another factor in controlling the curing environment is the temperature of the water in tube 16. Temperature sensor 21 indicates the temperature of the water at a point approximately 10 feet below the actual water-steam interface, and sends this data to temperature controller 22. The controller 22 in turn generates a 4 milliamp to 20 milliamp signal which is transmitted to proportional control valve 23 which is located in the bleed water line 24. Control valve 23 opens proportionately to the signal from controller 22 to bleed sufficient water from the tube 16 to maintain a substantially constant water temperature. Filter 25 is located between the water temperature control valve 23 and the point where water is being bled from the tube 16 to strain strips of plastic compound and pieces of insulation that get into the water being bled from the tube 16.

A seal controller 26 automatically tightens seals 27 in the tail housing 28 where cable 35 is being evacuated from the tube 16. By comparing the two 4 milliamp to 20 milliamp signals generated by the control devices 18 and 20 and the temperature signal generated by controller 22, leakage of water through the cable exit seals 27 is detected. When the signals reach predetermined values indicating leakage, a signal is generated by seal controller 26 to activate a seal pressure device 29 which pushes against the seals 27. The seal pressure device 29 indicates the amount of force being applied to the seal in a step operation. Force is applied until a predetermined force is reached, and then the seal pressure device 29 is stopped for a predetermined time of about 2 minutes. If the proper water level and the proper water temperature have not been achieved in the tube during the 2 minute time period, the seal pressure device 29 is reactuated until a higher predetermined force is achieved. This incremental increase is continued until maximum force is generated, and then the operator must replace seals 27.

Thus the actual water-steam interface is accurately controlled. The present invention eliminates the hot water zone of the tube and increases substantially the available curing space as well as the available cooling space. As a result, productivity is easily increased by increasing the speed of the advancing cable 35. The product quality is also enhanced by this ability to accurately control the curing environment, resulting in more completely cured product.

While this invention has been described in detail with particular reference to a preferred embodiment thereof, it will be understood that variations and modifications can be effective within the sphere and scope of the invention as described hereinbefore and as defined by the appended claims.

INDUSTRIAL APPLICABILITY

This invention is capable of exploitation in the cable making industry and is particularly useful in a system for the continuous vulcanization of thermosetting insulation or jacket of high voltage cable.

We claim:

1. A method of controlling the water-steam interface in a continuous vulcanization tube comprising the steps of:
   selecting a preferred water-steam interface position within said tube;
   detecting elevation of water in said tube near said preferred position by a water sensitive sensing means;
   converting detected elevation data into a water level signal;
   transmitting said signal to means for controlling flow of water into said tube; and
   controlling the position of said water-steam interface according to said level signal.

2. The method of claim 1, further comprising the steps of:
   detecting the temperature of water near said interface position;
   converting temperature data into a hot water signal; and
   discharging hot water from said tube based on said hot water signal.

3. The method of claim 1, further comprising the steps of:
   detecting the elevation of water in said curing tube;
   detecting the rate of flow of water into said tube;
   detecting the rate of flow of water from said tube;
   determining the temperature of water in said tube;
   determining amount of leakage at said exit seals based on water level, water flow and water temperature data; and
   adjusting the pressure of said exit seals.

4. The method of claim 1, further comprising the steps of:
   selecting a preferred minimum water level position;
   detecting absence of water at said position;
   converting said detected data into a low water signal; and
   reducing the amount of steam in said tube based on said signal.

5. The method of claim 4 further comprising the step of forcing water into said tube based on said signal.

6. The method of claim 1, further comprising the steps of:
   selecting a preferred maximum water level position;
   detecting presence of water at said position;
   converting said detected data into a high water signal; and
   preventing entrance of water into said tube.

7. A method of controlling the water-steam interface in a continuous vulcanization tube comprising the steps of:
   selecting a preferred water-steam interface position within said tube;
   detecting elevation of water in said tube near said preferred position by a water sensitive water level probe;
   converting detected elevation data into a water level signal proportional to the level of water in the tube;
   transmitting said signal to means for controlling the flow of cooling water into said tube;
   continuously pumping cooling water through a line connected to the means for controlling the flow of cooling water to said tube;
   proportionally opening and closing said means for controlling the flow of cooling water in response to the water level signal transmitted to the water level probe to supply a proportional portion of the cooling water to the tube to thereby control the position of the water-steam interface in the tube; and
   directing the portion of the pumped cooling water which is not supplied to the tube to a location external to the tube.

8. The method of claim 7, further comprising the steps of:
   detecting the temperature of water near said interface position;
   converting temperature data into a hot water signal; and
   discharging hot water from said tube based on said hot water signal.

9. The method of claim 7, further comprising the steps of:
   detecting the elevation of water in said curing tube;
   detecting the rate of flow of water into said tube;
   detecting the rate of flow of water from said tube;
   determining the temperature of water in said tube;
   determining amount of leakage at said exit seals based on water level, water flow and water temperature data; and adjusting the pressure of said exit seals.

10. The method of claim 7, further comprising the steps of:
  selecting a preferred minimum water level position;
  detecting absence of water at said position;
  converting said detected data into a low water signal; and reducing the amount of steam in said tube based on said signal.

11. The method of claim 7, further comprising the steps of:
  selecting a preferred maximum water level position;
  detecting presence of water at said position;
  converting said detected data into a high water signal; and
  preventing entrance of water into said tube.

* * * * *